United States Patent
Fujino et al.

(10) Patent No.: US 6,826,317 B2
(45) Date of Patent: Nov. 30, 2004

(54) PROOFREADER ABILITY MANAGING METHOD AND SYSTEM

(75) Inventors: Akio Fujino, Ota-ku (JP); Yoitsu Nakade, Ota-ku (JP); Hitoshi Ozawa, Ota-ku (JP); Tsutomu Matsushita, Ota-ku (JP); Mariko Kita, Ota-ku (JP)

(73) Assignee: Fujitsu Limited, Kawasaki (JP)

( * ) Notice: Subject to any disclaimer, the term of this patent is extended or adjusted under 35 U.S.C. 154(b) by 648 days.

(21) Appl. No.: 09/804,030

(22) Filed: Mar. 13, 2001

(65) Prior Publication Data

US 2002/0025070 A1 Feb. 28, 2002

(30) Foreign Application Priority Data

Aug. 31, 2000 (JP) ...................................... 2000-263602

(51) Int. Cl.⁷ ................................................ G06K 9/03
(52) U.S. Cl. ........................ 382/311; 345/708; 345/781; 382/156; 382/187; 382/192; 382/231; 715/533
(58) Field of Search ................................. 382/156, 157, 382/173, 181, 187, 192, 197, 231, 309, 311; 345/708, 781; 715/53

(56) References Cited

U.S. PATENT DOCUMENTS

| | | | | | |
|---|---|---|---|---|---|
| 4,974,260 A | * | 11/1990 | Rudak | ......................... | 382/311 |
| 5,052,043 A | * | 9/1991 | Gaborski | ..................... | 382/157 |
| 5,257,328 A | * | 10/1993 | Shimizu | ..................... | 382/311 |
| 5,535,313 A | * | 7/1996 | Schwab | ........................ | 345/418 |
| 5,563,957 A | * | 10/1996 | Ueno et al. | .................. | 382/173 |
| 5,576,955 A | * | 11/1996 | Newbold et al. | ........... | 715/533 |
| 5,923,792 A | * | 7/1999 | Shyu et al. | .................. | 382/309 |
| 5,991,742 A | * | 11/1999 | Tran | ............................. | 705/32 |
| 6,212,299 B1 | * | 4/2001 | Yuge | .......................... | 382/231 |
| 6,377,705 B1 | * | 4/2002 | Sato et al. | .................. | 382/197 |
| 6,407,828 B1 | * | 6/2002 | Medina | ...................... | 358/462 |
| 6,434,547 B1 | * | 8/2002 | Mishelevich et al. | .......... | 707/3 |
| 6,453,079 B1 | * | 9/2002 | McInerny | .................... | 382/311 |
| 6,556,883 B2 | * | 4/2003 | Iwayama | .................... | 700/108 |

* cited by examiner

*Primary Examiner*—Bhavesh M. Mehta
*Assistant Examiner*—Gregory Desire
(74) *Attorney, Agent, or Firm*—Staas & Halsey LLP

(57) ABSTRACT

A technology of the present invention is capable of objectively judging an ability of a proofreader who proofreads a digitized document by use OCR programs. A method of managing an ability of a proofreader who proofreads an electronic document generated from a recognition target document by executing a character auto recognition program, comprises a step of estimating a character count of potential mis-recognized characters contained in the electronic document, a step of detecting a mis-recognized character discover count as a mis-recognized character count with which the proofreader discovers the mis-recognized characters in the electronic document, a step of detecting a processing time spent for proofreading the electronic document, and a step of calculating a score relative to a proofreader ability based on a ratio of the potential mis-recognized character count to the mis-recognized character discover count per unit time.

12 Claims, 12 Drawing Sheets

FIG. 3

| DOCUMENT UNIT | DEGREE OF DIFFICULTY | DEGREE-OF-DIFFICULTY LEVEL |
|---|---|---|
| DOCUMENT 1 | 0.3% | 2 |
| DOCUMENT 2 | 10.5% | 9 |
| DOCUMENT 3 | 3.7% | 6 |
| DOCUMENT 4 | 4.1% | 6 |
| DOCUMENT 5 | 0.4% | 2 |
| DOCUMENT 6 | 0.4% | 2 |
| DOCUMENT 7 | 3.4% | 6 |
| DOCUMENT 8 | 0.3% | 2 |
| DOCUMENT 9 | 3.5% | 6 |
| DOCUMENT 10 | 4.7% | 6 |
| DOCUMENT 11 | 0.4% | 2 |

DEGRE OF DIFFICULTY=POTENTIAL MIS-RECOGNIZED CHRACTER RATE
= PLURAL OCRs NON-COINCIDENTCHARACTER COUNT / TOTAL CHARACTER COUNT * a

DEGREE-OF-DIFFICULTY LEVEL:
DEGREE OF DIFFICULTY IS LESSTHAN 0.2 → 1
OVER 0.2 LESSTHAN 0.5 → 2
OVER 0.5 LESSTHAN 1.0 → 3
OVER 1.0 LESSTHAN 2.0 → 4
OVER 2.0 LESSTHAN 3.0 → 5
OVER 3.0 LESSTHAN 5.0 → 6
OVER 5.0 LESSTHAN 7.5 → 7
OVER 7.5 LESSTHAN 10.0 → 8
OVER 10.0 → 9

FIG. 4

| PROOFREADER | DOCUMENT UNIT | DEGREE OF DIFFICULTY | DEGREE-OF-DIFFICULTY LEVEL | PROOFREADER ACHIEVEMENT RATE | PROOFREADER ABILITY SCORE | PROCESSING TIME |
|---|---|---|---|---|---|---|
| MR. X | DOCUMENT 1 | 0.3% | 2 | 0.25% | 83 | 10MIN. |
| MR. X | DOCUMENT 2 | 10.5% | 9 | 5.53% | 53 | 10MIN. |
| MR. X | DOCUMENT 3 | 3.7% | 6 | 2.62% | 71 | 10MIN. |
| MR. X | DOCUMENT 4 | 4.1% | 6 | 3.41% | 83 | 10MIN. |
| MR. X | DOCUMENT 5 | 0.4% | 2 | 0.36% | 90 | 10MIN. |
| MR. Y | DOCUMENT 6 | 0.4% | 2 | 0.29% | 73 | 10MIN. |
| MR. Y | DOCUMENT 7 | 3.4% | 6 | 2.53% | 74 | 10MIN. |
| MR. Y | DOCUMENT 8 | 0.3% | 2 | 0.19% | 63 | 10MIN. |
| MR. Z | DOCUMENT 9 | 3.5% | 6 | 3.12% | 89 | 10MIN. |
| MR. Z | DOCUMENT 10 | 4.7% | 6 | 4.46% | 95 | 10MIN. |
| MR. Z | DOCUMENT 11 | 0.4% | 2 | 0.31% | 78 | 10MIN. |

PROOFREADER ACHIEVEMENT RATE = MIS-RECOGNIZED CHARACTER DISCOVER COUNT / (TOTLA CHARACTER COUNT * PROCESSING TIME) * b
PROOFREADER ABILITY SCORE=PROOFREADER ACHIEVEMENT RATE/DEGREE OF DIFFICULTY

FIG. 5

| PROOFREADER | DEGREE-OF-DIFFICULTY LEVEL | PROOFREADER ABILITY LEVEL PER DEGREE-OF-DIFFICULTY LEVEL |
|---|---|---|
| MR. X | 2 | 80 |
| | 6 | 70 |
| | 9 | 50 |
| MR. Y | 2 | 60 |
| | 6 | 70 |
| MR. Z | 2 | 70 |
| | 6 | 90 |

PROOFREADER ABILITY LEVEL PER DEGREE-OF-DIFFICULTY IS VALUE OBTAINED BY ROUNDING OFF FIRST DIGIT OF AVERAGE VALUE OF PROOFREADER ABILITY SCORE PER DEGREE-OF-DIFFICULTY LEVEL OF PROOFREADER IN PROOFREADER EVALUATION SCORE TABLE

FIG. 8

| PROOFREADER | DOCUMENT UNIT | DEGREE OF DIFFICULTY | DEGREE-OF-DIFFICULTY LEVEL | PROOFREADER ACHIEVEMENT RATE | PROOFREADER ABILITY SCORE | PROCESSING TIME |
|---|---|---|---|---|---|---|
| MR. X | DOCUMENT 21 | 3.7% | 6 | 2.62% | 71 | 10MIN. |
| MR. X | DOCUMENT 22 | 4.1% | 6 | 3.41% | 83 | 10MIN. |
| MR. X | DOCUMENT 23 | 3.8% | 6 | 2.68% | 71 | 10MIN. |
| MR. X | DOCUMENT 24 | 4.7% | 6 | 3.23% | 68 | 10MIN. |
| MR. X | DOCUMENT 25 | 3.2% | 6 | 1.67% | 52 | 10MIN. |
| MR. Y | DOCUMENT 26 | 4.8% | 6 | 3.89% | 81 | 10MIN. |
| MR. Y | DOCUMENT 27 | 3.4% | 6 | 2.53% | 74 | 10MIN. |
| MR. Y | DOCUMENT 28 | 4.3% | 6 | 2.95% | 69 | 10MIN. |
| MR. Y | DOCUMENT 29 | 3.5% | 6 | 2.37% | 68 | 10MIN. |
| MR. Y | DOCUMENT 30 | 4.9% | 6 | 2.49% | 51 | 10MIN. |
| MR. Y | DOCUMENT 31 | 3.6% | 6 | 1.74% | 48 | 10MIN. |

PROOFREADER ACHIEVEMENT RATE = MIS-RECOGNIZED CHARACTER DISCOVER COUNT / (TOTLA CHARACTER COUNT * PROCESSING TIME) * b
PROOFREADER ABILITY SCORE=PROOFREADER ACHIEVEMENT RATE/DEGREE OF DIFFICULTY

FIG. 9

| DEGREE-OF-DIFFICULTY LEVEL | PROOFREADER ABILITY LEVEL | | PROOFREADER ABILITY SCORE | PROCESSING TIME | IDENTICAL PROOFREADER ABILITY SCORE DIFFERENCE | IDENTICAL PROOFREADER PROCESSING TIME ACCUMULATED TOTAL |
|---|---|---|---|---|---|---|
| | ABILITY LEVEL | PROOFREADER | DOCUMENT UNIT | | | |
| 6 | 70 | MR. X | DOCUMENT 21 | 71 | 10MIN. | — | 10MIN. |
| 6 | 70 | MR. X | DOCUMENT 22 | 83 | 10MIN. | +12 | 20MIN. |
| 6 | 70 | MR. X | DOCUMENT 23 | 71 | 10MIN. | −12 | 30MIN. |
| 6 | 70 | MR. X | DOCUMENT 24 | 68 | 10MIN. | −3 | 40MIN. |
| 6 | 70 | MR. X | DOCUMENT 25 | 52 | 10MIN. | −16 | 50MIN. |
| 6 | 70 | MR. Y | DOCUMENT 26 | 81 | 10MIN. | — | 10MIN. |
| 6 | 70 | MR. Y | DOCUMENT 27 | 74 | 10MIN. | −7 | 20MIN. |
| 6 | 70 | MR. Y | DOCUMENT 28 | 69 | 10MIN. | −5 | 30MIN. |
| 6 | 70 | MR. Y | DOCUMENT 29 | 68 | 10MIN. | −1 | 40MIN. |
| 6 | 70 | MR. Y | DOCUMENT 30 | 51 | 10MIN. | −17 | 50MIN. |
| 6 | 70 | MR. Y | DOCUMENT 31 | 48 | 10MIN. | −3 | 60MIN. |

FIG.10

| DEGREE OF DIFFICULTY LEVEL | PROOFREADER ABILITY LEVEL FOR DEGREE OF DIFFICULTY | OPTIMAL OPERATION TIME |
|---|---|---|
| . | . | . . |
| . | . | . . |
| . | . | . . |
| 6 | 70 | 40 MIN |
| . | . | . . |

PROOFREADER ABILITY MANAGING METHOD AND SYSTEM

BACKGROUND OF THE INVENTION

The present invention relates to a technology of enhancing an efficiency of proofreading text data generated by an auto character recognizing system.

With a spread of the Internet over the recent years, what becomes important is a technology for digitizing an existing paper document into an electronic document. The digitized document from the paper document is obtained normally based on OCR (Optical Character Reader) programs on a computer.

This OCR program automatically recognizes the characters recorded on the paper. A mis-recognition might, however, occur in this character recognizing process. It is therefore dispensable for the document digitized by the OCR program to detect and correct the mis-recognized character (which will hereinafter be called proofreading). An efficiency of this proofreading operation largely depends on an ability of a proofreader. Accordingly, it is essential to exactly grasp at first the proofreader ability in order to enhance the efficiency of the proofreading operation.

No technology of objectively grasping the proofreader ability has, however, been proposed so far. This is because proofreading target documents (which will hereinafter be referred to as manuscript) have a diversity in category, and there do not exist criteria for defining the proofreader ability, wherein especially a degree of difficulty of the manuscript is not clear. Accordingly, the ability evaluation largely fluctuates depending on the modifying target manuscript.

SUMMARY OF THE INVENTION

It is a primary object of the present invention, which was devised to obviate the problems inherent in the prior art, to provide a technology capable of objectively judging an ability of a proofreader of a digitized document by use of OCR programs.

The present invention also aims at dynamically evaluating the proofreader ability, detecting a decrease in operation efficiency, setting a proper operation time, and thus judging a operation exchange timing.

To accomplish the above object, according to one aspect of the present invention, a method of managing an ability of a proofreader who proofreads an electronic document generated from a recognition target document by executing character auto recognition programs, the method comprises a step of estimating a character count of potential mis-recognized characters contained in the electronic document, a step of detecting a mis-recognized character discover count as a mis-recognized character count with which the proofreader discovers the mis-recognized characters in the electronic document, a step of detecting a processing time spent for proofreading the electronic document, and a step of calculating a score relative to a proofreader ability based on a ratio of the potential mis-recognized character count to the mis-recognized character discover count per unit time.

The step of counting the potential mis-recognized character count may include a step of counting a non-coincident character count between the electronic documents generated by executing plural types of character auto recognition programs with respect to the same recognition target document, or a step of counting a character count of which a degree of coincidence showing a preciseness of the character auto recognition program-assisted recognition of each character is a predetermined value or under.

The method of managing the ability of the proofreader may further comprise a step of calculating a degree of difficulty of a proofreading target electronic document on the basis of a ratio of the potential mis-recognized character count to a total character count of the electronic document, a step of calculating a proofreader ability level by averaging the scores with respect to the plurality of proofreading target electronic documents per predetermined range of the degree of difficulty, and a step of selecting an optimal proofreader corresponding to the degree of difficulty of the proofreading target electronic document.

The method of managing the ability of the proofreader may further comprise a step of calculating a change in the score relative to the proofreader ability with respect to the operation time for consecutively proofreading the plurality of proofreading target electronic documents, and a step of setting the operation time based on the change in the score relative to the proofreader ability.

The method of managing the ability of the proofreader may further comprise a step of evaluating the proofreader ability for every predetermined operation time, and a step of setting again the operation time on the basis of the change in the proofreader ability.

According to another aspect of the present invention, a system for managing an ability of a proofreader who proofreads an electronic document generated from a recognition target document by executing character auto recognition programs, comprises an information input/output unit (6, 7, 8) for detecting a mis-recognized character discover count with which the proofreader discovers the mis-recognized characters in the electronic document, and a processing time spent for proofreading the electronic document; an information recording unit (3, 4), an information display unit (5), and a control unit (2) for executing a step of counting a character count of potential mis-recognized characters contained in the electronic document, and a step of calculating a score relative to a proofreader ability based on a ratio of the potential mis-recognized character count to the mis-recognized character discover count per unit time.

The system for managing the ability of the proofreader may further comprising a timer. The information input/output unit may detect a start if the proofreading operation and an end of the proofreading operation, and the timer may count a period of time from the start of the proofreading operation to the end of the proofreading operation.

According to a further aspect of the present invention a readable-by-computer recording medium may be recorded with a program is executed by a computer and comprising the processes described above.

As described above, according to the present invention, the ability of the proofreader of the document digitized by the OCR programs can be objectively judged.

Further, according to the present invention, it is feasible to judge an operation exchange timing by dynamically evaluating the proofreader ability, detecting a decrease in operation efficiency and setting a proper operation time.

BRIEF DESCRIPTION OF THE DRAWINGS

FIG. 3 is a diagram showing a data structure of a degree-of-difficulty table;

FIG. 4 is a diagram showing a data structure of a proofreader evaluation score table in the first embodiment;

FIG. 5 is a diagram showing a data structure of a proofreader ability table;

FIG. 8 is a diagram showing an example of the proofreader evaluation score table in a second embodiment;

FIG. 9 is a diagram showing a data structure of a proofreader evaluation score variation table;

FIG. 10 is a diagram showing a data structure of an optimal operation time table in which an optimal operation time is entered corresponding to every degree-of-difficulty level and every proofreader ability level;

DETAILED DESCRIPTION OF THE PREFERRED EMBODIMENTS

Preferred embodiments of the present invention will hereinafter be described with reference to the accompanying drawings.

First Embodiment

Figure 1:
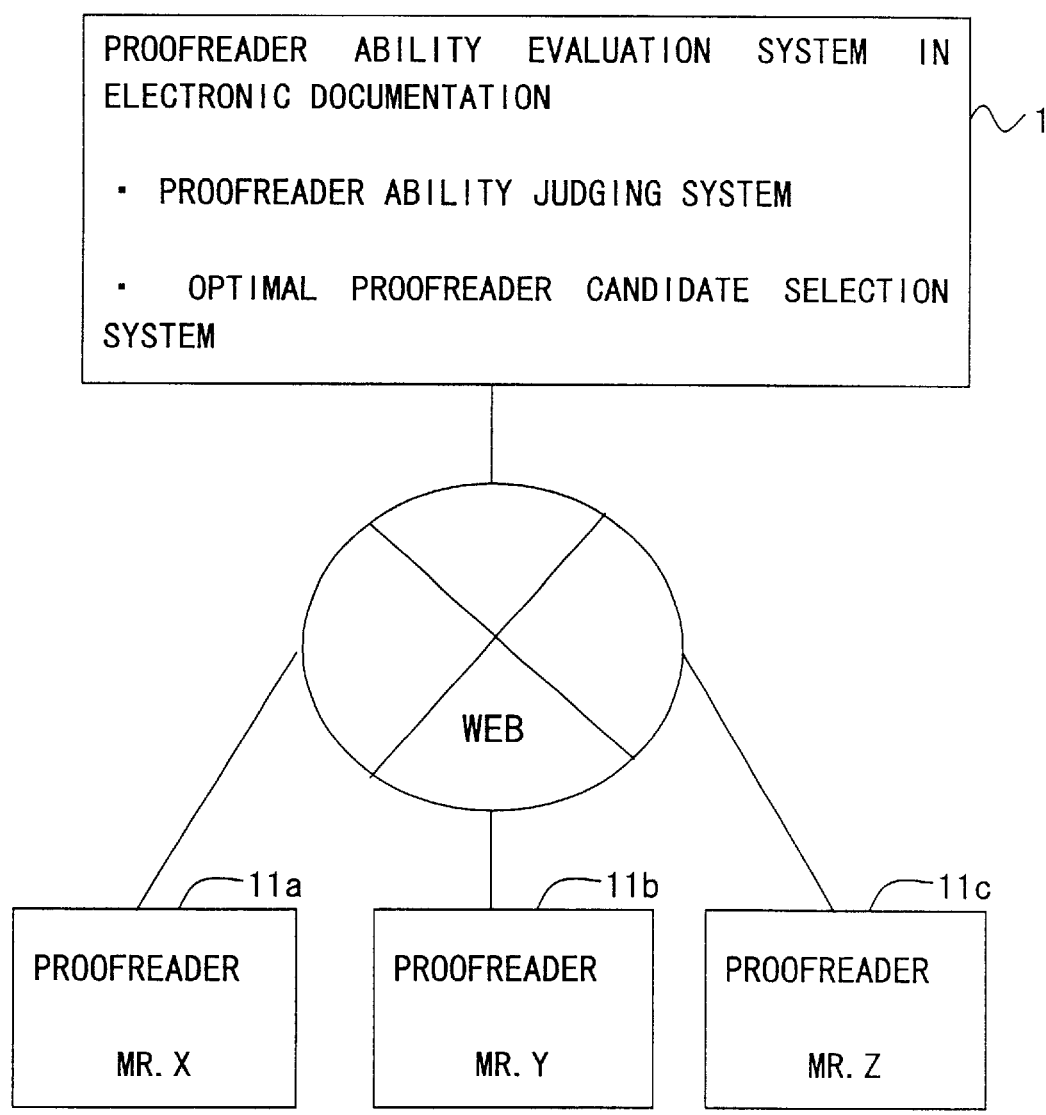
FIG. 1 is a diagram showing a system architecture of a proofreader evaluation system in a first embodiment of the present invention.
Figure 2:
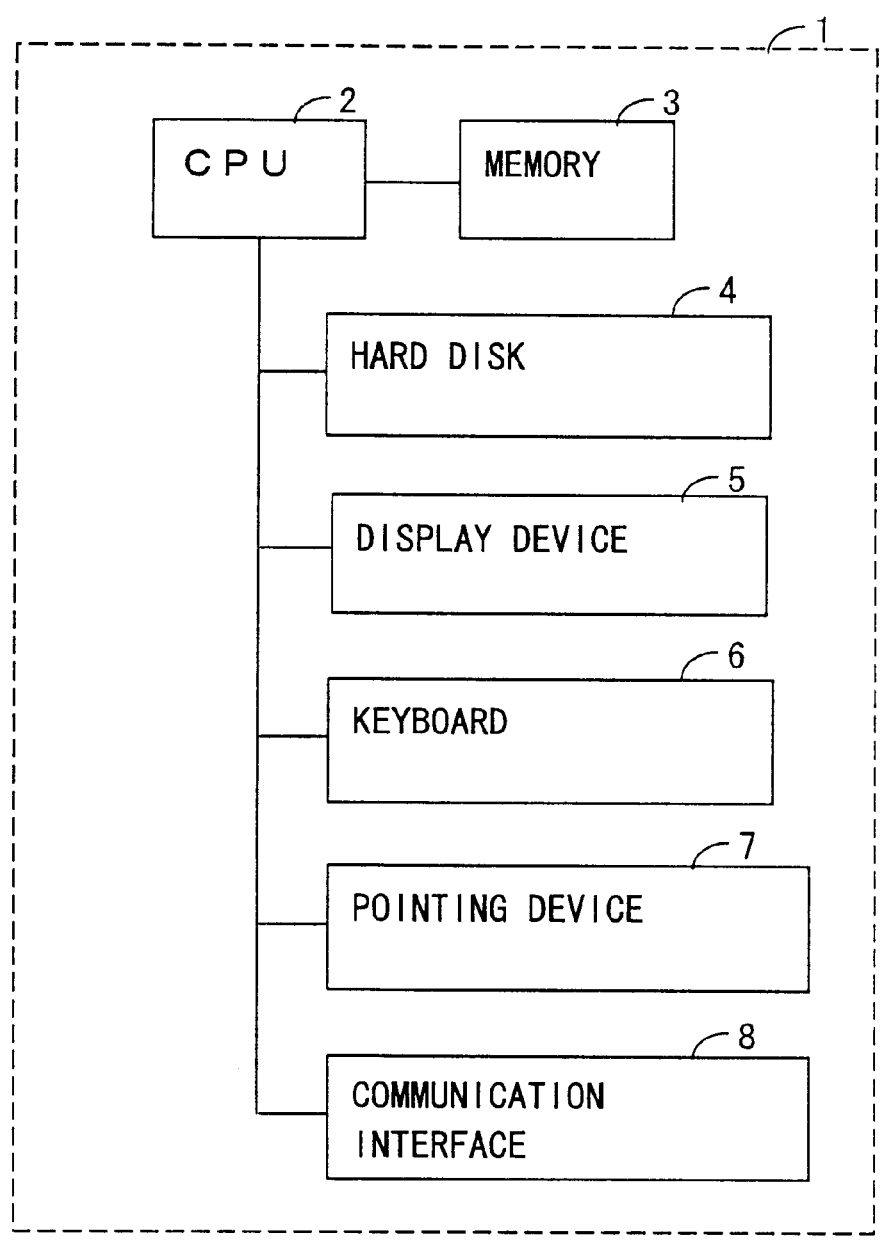
FIG. 2 is a diagram showing a hardware architecture of a server 1.
Figure 6:
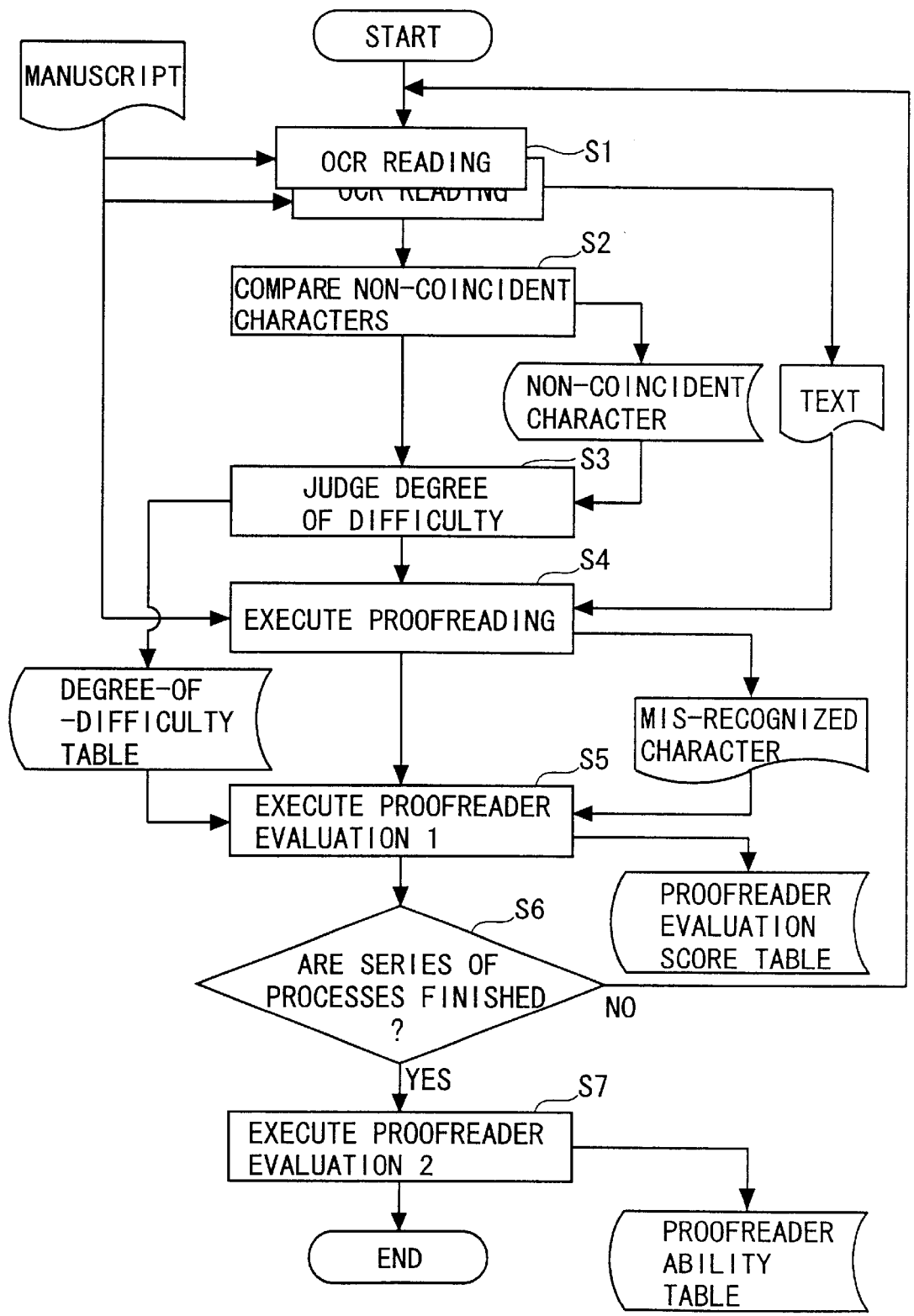
FIG. 6 is a flowchart showing processing steps of judging an ability of the proofreader.
Figure 7:
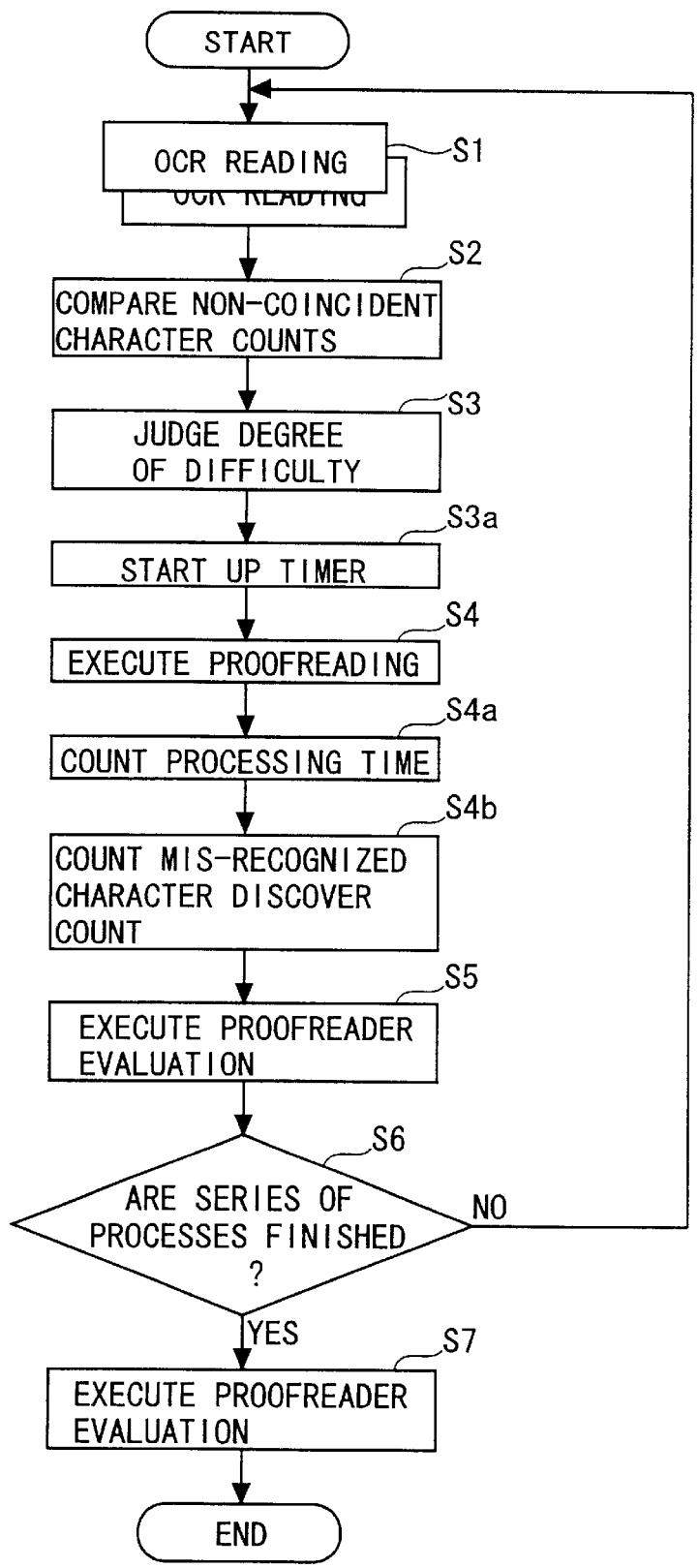
FIG. 7 is a flowchart showing processing steps of judging the ability of the proofreader in a modified example.

A first embodiment of the present invention will hereinafter be described with reference to FIGS. 1 through 7. FIG. 1 is a diagram showing a system architecture of a proofreader evaluation system in the first embodiment of the present invention. FIG. 2 is a diagram showing a hardware architecture of a server 1 shown in FIG. 1. FIG. 3 is a diagram showing a data structure of a degree-of-difficulty table showing a degree of difficulty of a manuscript as a proofreading target. FIG. 4 is a diagram showing a data structure of a proofreader evaluation score table for evaluating a proofreader. FIG. 5 is a diagram showing a data structure of a proofreader ability table. FIG. 6 is a flowchart showing processing steps for judging a ability of a proofreader. FIG. 7 is a flowchart showing processing steps in a modified example of the first embodiment.

System Architecture

FIG. 1 shows a system architecture of the proofreader ability evaluation system. This system is configured by a server 1 and proofreader terminals 11a, 11b, 11c, which are connected via a network.

The server 1 provides the proofreader terminal 11a etc with a web page based on HTTP (HyperText Transfer Protocol). Further, the server 1 notifies the proofreader terminal 11a etc of a message by an E-mail.

Moreover, the server 1 executes a proofreader ability judging program and an optimal proofreader candidate selection program, and supports an operation of the proofreader ability evaluation system.

Proofreader Ability Judging Program

The proofreader ability judging program, at first, obtains a degree of difficulty and a total number of characters of the manuscript by executing plural types of OCR programs with respect to the same recognition target document.

Next, the proofreader ability judging program assists each proofreader to input a mis-recognized character discover count and a processing time when each proofreader proofreads the manuscript. Each proofreader inputs these values by use of the proofreader terminal 11a etc. Then, the proofreader ability judging program calculates a proofreader achievement rate from the mis-recognized character discover count, the processing time and the total character count.

Further, the proofreader ability judging program calculates a proofreader ability score based on the proofreader achievement rate with respect to the degree of difficulty of each manuscript. The proofreader ability score is a value into which a proofreader achievement rate is normalized by the degree of difficulty.

Moreover, the proofreader ability judging program sorts out the manuscripts with levels in a predetermined range. This predetermined range may be defined as a degree-of-difficulty level. Then, the proofreader ability judging program averages the proofreader ability scores of the proofreaders for every degree-of-difficulty level. The proofreader ability score averaged for every degree-of-difficulty level is defined as a proofreader ability level. The proofreader ability judging program records this proofreader ability level in a proofreader ability table.

Moreover, the proofreader ability judging program repeats the above-described evaluation each time the proofreading process is finished, then calculates the proofreader ability level, and stores these levels on the hard disk 4 shown in FIG. 2.

Optimal Proofreader Candidate Selection Program

An optimal proofreader candidate selection program selects, for the proofreading operation, an operator having a proofreader ability level presumed optimal corresponding to the degree of difficulty of the manuscript concerned. Further, the optimal proofreader candidate selection program displays a proofreading operation schedule of the manuscript on the web page. Moreover, the optimal proofreader candidate selection program indicates the proofreader terminal 11a etc of the selected proofreader to perform the operation.

Hardware Architecture

FIG. 2 is the diagram showing the hardware architecture of the server 1. This server 1 includes a CPU 2 for executing the program, a memory 3 for storing the program executed by the CPU 2 and data processed by the CPU 2, the hard disk 4 for recording the program and the data, a display device 5 for displaying pieces of information of menus, icons, messages etc, a keyboard 6 for inputting character data, a pointing device 7 for manipulating the menus and the icons on the display device 5 and a communication interface 8 for accessing the network.

The CPU 2 executes the program together with an OS stored in the memory 3, thereby providing a function as the server 1 in which the OS provides a function of a timer.

The memory 3 is stored with the program executed by the CPU 2 and the data processed by the CPU 2.

The hard disk 4 is recorded with the program executed by the CPU 2 and the data processed by the CPU 2.

The display device 5 displays the information inputted by the operator of the server 1, and the information of the menus, the icons, the messages etc. For example, a CRT (Cathode Ray Tube), a liquid crystal display etc may be used as the display device 5.

The keyboard 6 is used for inputting the character data. The pointing device 7 is used for manipulating the menus and the icons displayed on the display device 5. For instance, a mouse, a trackball, an electrostatic pointing device, a laser type pointing device, a touch panel etc may be used as the pointing device 7.

The communication interface 8 given a command from the CPU 2 accesses the network and communicates with the proofreader terminal 11a etc and other host computer on the network.

An architecture of the proofreader terminals 11a etc is the same as the server 1, and therefore its repetitive explanation is omitted. The proofreader terminal 11a etc may be more inexpensive than the server 1.

Data Structure

FIG. 3 is the diagram showing a data structure of the degree-of-difficulty table. This table is recorded with pieces of data of manuscripts (which is entered as document unit in FIG. 3), degrees of difficulty, and degree-of-difficulty levels. Namely, each record in this table consists of a "document unit" field, a "degree-of-difficulty" field, and a "degree-of-difficulty level" field.

The document unit field is recorded with unique character strings for identifying the manuscripts, i.e., recorded with document 1, document 2 etc.

The degree-of-difficulty field is recorded with the degrees of difficulty of each document. The degree of difficulty is calculated based on a difference between character recognized results by a plurality of OCR programs with respect to the recognition target document before being transformed into an electronic document. That is, the server 1 obtains a non-coincident character count between the electronic documents generated by the plurality of OCR programs (which will hereinafter simply be called the non-coincident character count between the OCR programs), and obtains the degree of difficulty by the following (Formula 1). This non-coincident character count between the OCR programs may also be called a potential mis-recognized character count. Further, a character recognition system for detecting the mis-recognized character based on the non-coincident character described above, is proposed by the present applicant in Japanese Patent Application No.11-261968.

Degree of Difficulty=Plurality of OCRs Non-Coincident Character Count/Total Character Count×a=Potential Mis-Recognized Character Count/Total Character Count×a (Formula 1)

where a is a coefficient for making a fine adjustment of the degree of difficulty, and an initial value thereof is 1.

The degree-of-difficulty field is recorded with the degree-of-difficulty level of each document. The degree-of-difficulty levels are defined as values into which the degrees of difficulty are ranked at nine levels. As shown in FIG. 3, the degree-of-difficulty levels are sorted out in such a way that when the degree of difficulty is less than 0.2, the degree-of-difficulty level is 1, when the degree of difficulty is over 0.2 but less than 0.5, the degree-of-difficulty level is 2, and so on. The basis for setting the degree-of-difficulty level is periodically reviewed so that the document numbers do not concentrate on a given degree-of-difficulty level.

FIG. 4 is the diagram showing the data structure in the proofreader evaluation score table in the first embodiment. This table is recorded with the operation achievement of each proofreader in every record. Each of the proofreaders, each time the proofreading operation is completed, informs the unillustrated the server 1's web page of the mis-recognized character count and the processing time in the proofreading operation. Each record in this table contains the proofreader achievement rate and the proofreader ability score that are calculated based on the informed result and the information itself.

Namely, as shown in FIG. 4, each record in the proofreader evaluation score table consists of a "proofreader" field, a "document unit" field, a degree-of-difficulty" field, a "proofreader achievement rate" field, a "proofreader ability score" field and a "processing time" field.

The proofreader field is recorded with a name of the proofreader in charge of the proofreading operation concerned. As a substitute for the name, a name number that is unique enough to identify an in-office proofreader may also be recorded in the table.

The document unit field is recorded with a character string for identifying a proofreading target manuscript in the proofreading operation concerned.

The degree-of-difficulty field and the degree-of-difficulty level field are the same as in the case of FIG. 3, and their repetitive explanations are omitted.

The proofreader achievement rate may be defined as an operation efficiency of the proofreader that is given by the following (Formula 2).

Proofreader Achievement Rate=Mis-Recognized Character Discover Count/(Total Character Count×Processing Time)×b (Formula 2)

where the processing time is a processing time of the proofreading operation that is inputted by the proofreader. Further, b is a coefficient for making a fine adjustment of the proofreader achievement rate, and its initial value is 1.

The proofreader ability score is, as shown in the following (Formula 3), a numerical value into which the proofreader achievement rate is standardized with the degree of difficulty of the proofreading target document.

Proofreader Ability Score=Proofreader Achievement Rate/Degree of Difficulty (Formula 3)

Note that the proofreader ability score may be calculated based on the (Formula 1) and the (Formula 3) in the following (Formula 4).

Proofreader Ability Score=Mis-Recognized Character Discover Count/(Potential Mis-recognized Character Count×Processing Time)×(b/a) (Formula 4)

Note that the processing time field in FIG. 4 is recorded with the processing time of the proofreading operation that is inputted by the proofreader as described above.

FIG. 5 is the diagram showing the data structure in the proofreader ability table. The proofreader ability table is recorded with an ability level of the proofreader when each proofreader processes the manuscript having the degree-of-difficulty level. The ability level is the proofreader ability level and may be defined as a value obtained by averaging the proofreader ability scores per proofreader and per degree-of-difficulty level in the proofreader evaluation score table shown in FIG. 4, and by rounding off the first digit.

Function and Effect

FIG. 6 is the flowchart showing the processing steps of judging the ability of the proofreader. As shown in FIG. 1, the server 1 executes the program of the proofreader ability judging system, and supports the execution of the steps shown in FIG. 6. On the other hand, each proofreader accesses the web page of the server 1 from the proofreader terminal 11a etc, then informs the web page of a completion of the proofreading operation, and receives an assignment of the next operation.

In this processing step, to start with, the server 1 indicates the unillustrated terminal for executing the OCR to execute the plurality of OCR programs and to read the recognition target document (S1) The server 1 may by itself, however, execute the OCR programs. With this process, an electronic document (which is displayed as a text in FIG. 6) serving as the manuscript to be proofread, is generated.

Next, the server 1 compares the generated results of the electronic documents by the OCR programs, and counts a non-coincident character count for every OCR program (S2).

Subsequently, the server 1 judges a degree of difficulty of the manuscript in accordance with the (Formula 1) (S3). The degree of difficulty judged is recorded in the degree-of-difficulty table.

Next, the server 1 notifies the proofreader, whose ability is judged, that a preparation for the proofreading operation is settled. Upon this notification, the proofreader starts proofreading (S4). The proofreader, upon a completion of the proofreading operation, notifies the server 1' web page of the mis-recognized character count and the processing time thereof.

Then, the server 1 advances the control to a proofreader evaluation 1 (S5). In the proofreader evaluation 1, the server 1, based on the notification from the proofreader, evaluates the proofreader in accordance with the (Formula 2) and the (Formula 3), and records this evaluation score in the proofreader evaluation score table.

Subsequently, the server 1 judges whether or not a series of ability judging processes with respect to the proofreader concerned are finished (S6). This is the judgement as to whether or not the proofreader concerned has executed the proofreading operations of all the manuscripts needed for judging the ability.

If the proofreading operations of all the manuscripts needed for judging the ability are not yet completed (No judgement in S6), the server loops the control back to the process in S1. Whereas if the proofreading operations of all the manuscripts are finished (Yes judgement in S6), the server 1 advances the control to a proofreader evaluation 2 (S7).

In the proofreader evaluation 2, the server 1 calculates a proofreader ability level from the proofreader evaluation score table recorded with the score in the process in S5, and records this ability level in the proofreader ability table (shown in FIG. 5). The processing is ended with this recording.

As a result of what has been done so far, as shown in FIG. 5, the proofreader ability levels of the proofreader are entered corresponding to the degree-of-difficulty levels. Accordingly, the server 1, when given a manuscript and notified of a degree of difficulty thereof, is capable of selecting a proofreader in charge of proofreading this manuscript. Namely, the server 1 executes the program of the optimal candidate selection system shown in FIG. 1, thereby selecting the proofreader.

For instance, in the example shown in FIG. 5, as for the manuscript of which the degree-of-difficulty is 2, Mr. X gains a score of 80, Mr. Y gains a score of 60 and Mr. Z gains a score of 70 as values of the proofreader ability levels with respect to the degree-of-difficulty level 2. Then, Mr. X who exhibits the highest value of the proofreader ability level is selected for the manuscript of which the degree-of-difficulty is 2.

As discussed above, according to the proofreader ability evaluation system in the first embodiment, to begin with, the degree of difficulty of the manuscript is evaluated, and the proofreader achievement rate is standardized based on the degree of difficulty of the manuscript. The thus calculated proofreader ability score eliminates an influence by the degree of difficulty of the manuscript, whereby the abilities of the proofreaders are relatively objectively grasped.

Further, the present proofreader ability evaluation system is, as shown in FIG. 5, the proofreader ability levels of the proofreaders are grasped corresponding to the degree-of-difficulty levels of the manuscripts, and it is therefore feasible to select the optimal proofreader corresponding to the degree of difficulty.

Modified Example of Manuscript Degree-of-Difficulty Estimation Procedure

In the first embodiment, the plural types of OCR programs are executed to the same recognition target document, and the degree of difficulty of the manuscript is estimated base on the non-coincident character count between the generated electronic documents. The embodiment of the present invention is not, however, limited to the procedure of estimating the degree of difficulty of the manuscript.

For instance, generally when executing the OCR program, a numerical value for indicating a preciseness of the recognition is given for every character recognized (which is termed a degree of coincidence). This degree of coincidence is normally calculated based on a similarity an on-space line distance in the character between the character to be recognized and each character of a built-in dictionary of the OCR.

The number of characters of which the degree of coincidence is a predetermined value or under may be counted as a potential mis-recognized character count. Then, a ratio of the potential mis-recognized character count to the total character count of the manuscript, may also be set as a degree of difficulty.

In the first embodiment, the ability f the proofreader is evaluated by each proofreader inputting, to the web page, the mis-recognized character discover count and the processing time when the proofreader proofreads the manuscript. The embodiment of the present invention is not, however, confined to these steps. For example, the server may automatically recognize the start and end of the operation and measures the operation time in accordance with the operation of the operator. Further, the server 1 may automatically estimate the mis-recognized character discover count from the non-coincidence character count between the manuscript before the proofreading and the manuscript after the proofreading.

FIG. 7 shows processing steps of the server 1 in that case. The processing in FIG. 7 is different from FIG. 6 in terms of such a point that the timer is started up (S3a) in the server 1 before the proofreading (S4), and the processing time is measured by the server 1 after the proofreading (S4a). Other processes are the same as those in FIG. 6 and marked with the same symbols, of which the repetitive explanations are omitted.

In the processing in FIG. 7, when the starting the proofreading, the proofreader notifies the server 1 of the start of the proofreading with this notification, the server 1 starts the timer built in OS (S3a). Then, after a completion of the proofreading, the proofreader notifies the server 1 of the completion of the proofreading operation. Upon the notification, the server 1 stops the timer and measures the processing time (S4a).

Further, the server 1 generates a difference between the manuscript before being proofread and the manuscript after being proofread, and counts the mis-recognized character discover count (S4b). A diff command in the unix system is known as a program for generating such a difference.

The server 1 executes the proofreader evaluation 1 by use of the processing time and the mis-recognized character discover count that are measured as described above (S5). The processes after S5 are the same as those in FIG. 6.

Second Embodiment

Figure 11:
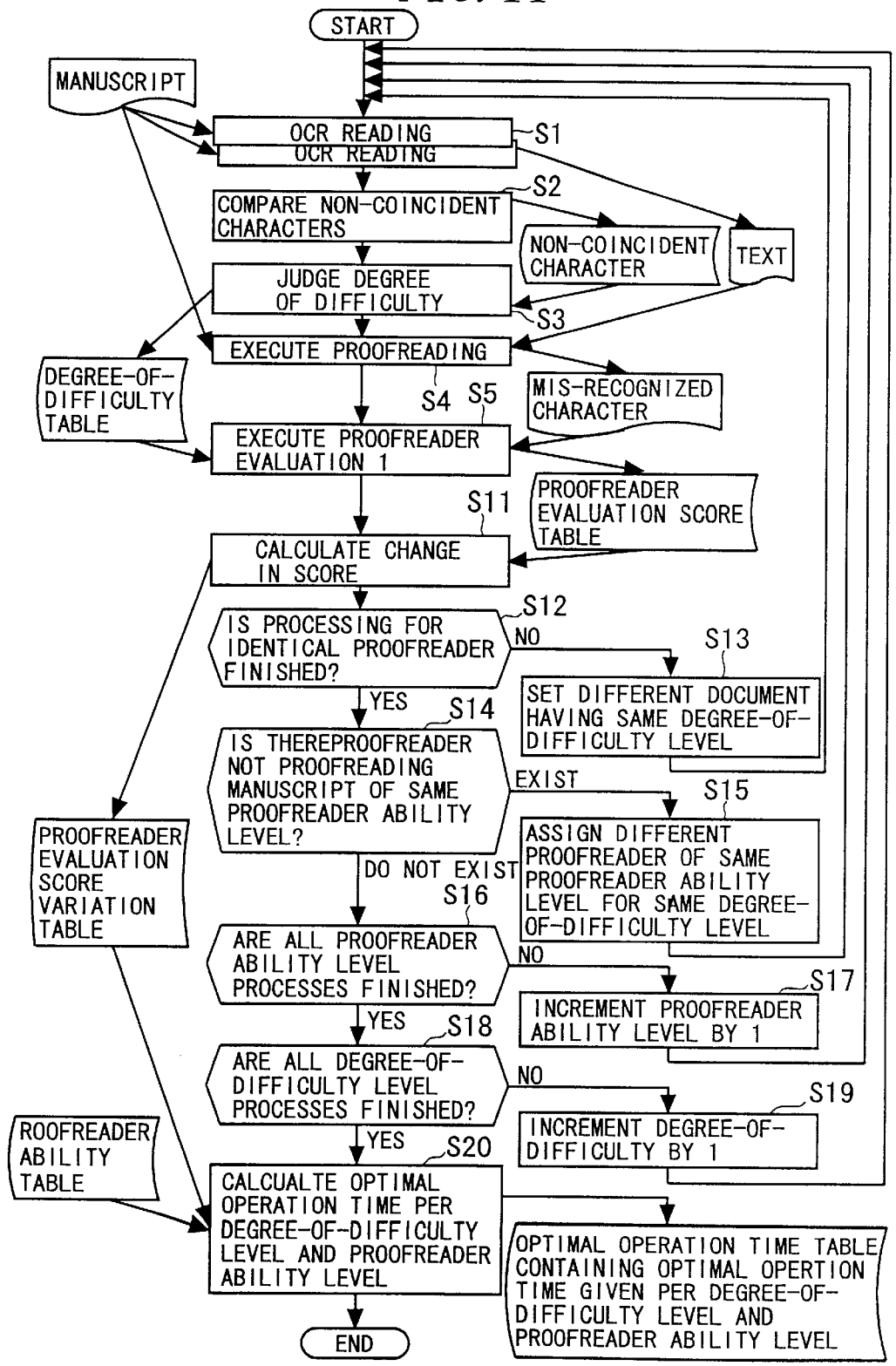
FIG. 11 is a flowchart showing processing steps of obtaining an optimal operation time.
Figure 12:
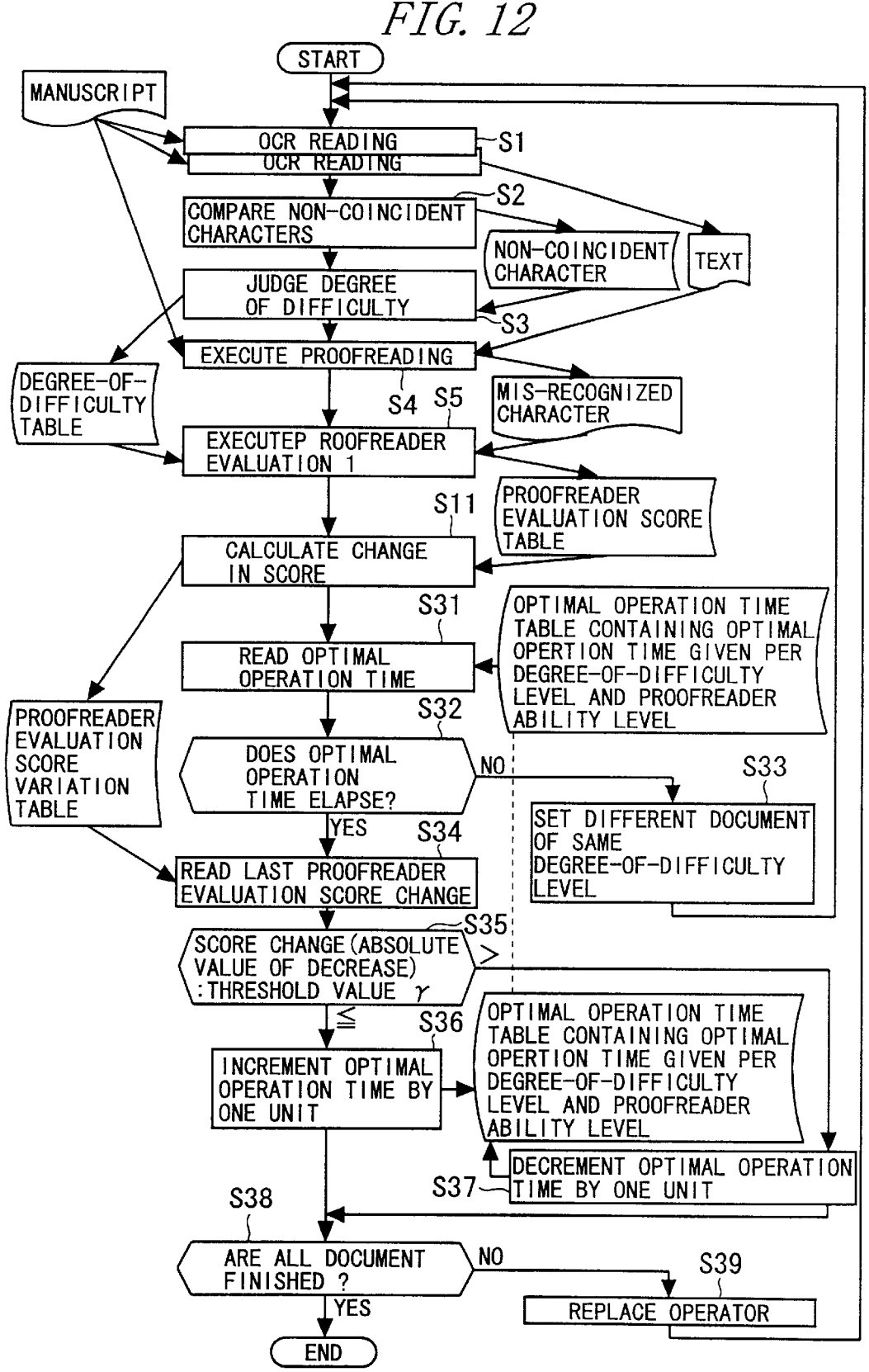
FIG. 12 is a flowchart showing processing steps of dynamically determining an optimal operation time.

A second embodiment of the present invention will be described with reference to FIGS. 8 through 12. FIG. 8 shows an example of the proofreader evaluation score table in the second embodiment of the present invention. FIG. 9 is a diagram showing a data structure of the proofreader evaluation score variation table. FIG. 10 is a diagram showing a data structure of an optimal operation time table based on the degree-of-difficulty level. FIG. 11 is a flowchart showing processing steps for obtaining an optimal operation time. FIG. 12 is a flowchart showing processing steps for dynamically determining the optimal operation time.

The first embodiment has exemplified the proofreader ability evaluation system for selecting the optimal proofreader. The second embodiment will exemplify a proofreader ability evaluation system for determining an optimal operation time corresponding to the degree-of-difficulty of the manuscript and the ability level of the proofreader who proofreads the manuscript.

Other configurations and functions in the second embodiment are the same as those in the first embodiment. Then, the same components are marked with the same numerals, and their repetitive explanations are omitted. Further, the drawings in FIGS. 1 through 7 are referred to as the necessity may arise.

System Architecture

A system architecture of the proofreader ability evaluation system in the second embodiment is the same as in the first embodiment (see FIG. 1). The second embodiment is, however, different from the first embodiment in terms of such a point that the server 1 executes an optimal operation time determination program that follows.

The server 1, when executing this program, is notified of a result of proofreading the document having the same degree-of-difficulty level with respect to the same proofreader, and calculates a proofreader ability score based on the result of this proofreading. Then, the server 1 calculates a difference between the proofreader ability scores, and sets, as an optimal operation time, a point of time when the difference in a descending direction exceeds a fixed value. A threshold value of this difference in the descending direction is empirically determined by repeating the same trial a plurality of times.

Data Structure

FIG. 8 shows an example of the proofreader evaluation score table in the second embodiment. The data structure of the table shown in FIG. 8 is the same as in the first embodiment. The second embodiment is, however, different from the first embodiment in terms of such a point that the ability of the proofreader is evaluated, wherein the degree-of-difficulty of the manuscript that is used for evaluating the ability of the proofreader is fixed to a given value. Namely, referring to FIG. 8, the evaluation is repeated by use of a variety of manuscripts of which the degree-of-difficulty levels are unified to 6.

FIG. 9 is a diagram showing the data structure in the proofreader evaluation score variation table. This table serves to record a difference between the proofreader ability scores when consecutively executing the proofreading operation.

This table has a "degree-of-difficulty level" field, an "ability level" (which is the same as the proofreader ability level) field, a "proofreader" field, a "document unit" field, a "proofreader ability score" field, a "processing time" field, an "identical proofreader ability score difference" field, an "identical proofreader processing time accumulated total" field.

The degree-of-difficulty level, the ability level, the proofreader, the document unit, the proofreader ability score and the processing time, are the same as those described in the first embodiment, so that their explanations are omitted. In the case of FIG. 9, however, the proofreading target is the manuscript of which the degree-of-difficulty level is the fixed value as in the case of FIG. 8.

The identical proofreader ability score difference may be defined as a variation quantity of the proofreader ability score from the operation of the last time if the same proofreader continues the proofreading operation. The identical proofreader processing time accumulated total is an accumulated total of periods of the processing time (which corresponds to an operation time) if the same proofreader continues the proofreading operation.

FIG. 10 is a diagram showing the data structure in the optimal operation time table in which the optimal operation time is given corresponding to the degree-of-difficulty level and the proofreader ability level. This table is stored with the optimal operation time entered corresponding to the degree-of-difficulty level and the proofreader ability level. The server 1 executes an optimal operation time determination program, thereby determining the optimal operation time. The optimal operation time is determined based on the identical proofreader ability score difference shown in FIG. 9.

Function and Effect

FIG. 11 is a flowchart showing processing steps for obtaining the optimal operation time. Referring to FIG. 11, the processes in S1 through S5 are the same as those in FIG. 6, and therefore the repetitive explanations are omitted. In the steps shown in FIG. 11, however, the same proofreader repeats proofreading the manuscript exhibiting the same degree-of-difficulty level.

When recording the proofreader ability score given with respect to the result of proofreading the present manuscript (S5), the server 1 next calculates a difference (a change in score) from the proofreader ability score of the last time (S11). This difference is recorded in the proofreader evaluation score variation table.

Next, the server 1 judges whether or not the evaluation of the proofreader concerned comes to an end (S12). This is the judgement as to whether or not a series of proofreading operations at the relevant degree-of-difficulty level by the proofreader concerned are finished.

If the evaluation about the same proofreader continues, the server 1 sets a different document having the same degree-of-difficulty level (S13), and loops the control back to S1.

While on the other hand, when the evaluation of the relevant proofreader at the degree-of-difficulty level concerned is ended, the server 1 judges whether or not there exists a proofreader who does not yet perform the proofreading operation of the manuscript having the relevant degree-of-difficulty level at the same proofreader level (S14).

If such a proofreader exists (Yes judgement in S14), the server 1 assigns a different proofreader having the same proofreader ability level with respect to the same degree-of-difficulty level (S15). Then, the server 1 returns the control to S1.

Whereas if such a proofreader does not exist (No judgement in S14), the server 1 judges whether or not the evaluations of the proofreaders of all the proofreader ability levels with respect to the degree-of-difficulty level concerned, are finished (S16).

If the evaluations of the proofreaders of all the proofreader ability levels are not finished (No judgement in S16), the server 1 increments the proofreader ability level by 1, then assigns a proofreader higher by one level, and loops the control back to S1.

Whereas if the evaluations of the proofreaders of all the proofreader ability levels are finished (Yes judgement in S16), the server 1 judges whether or not the evaluations at all the degree-of-difficulty levels are finished (S18).

If the evaluations at all the degree-of-difficulty levels are not finished (No judgement in S18), the server 1 increments the degree-of-difficulty level by 1 (S19), and sets the control back to S1. The same evaluation is thereby repeated with respect to the manuscript higher by one level in the degree of difficulty.

Whereas if the evaluations at all the degree-of-difficulty levels are finished (Yes judgement in S18), the server 1 calculates the optimal operation time given corresponding to every degree-of-difficulty level and every proofreader ability level (S20). The optimal operation time is a time when the difference in the descending direction between the proofreader ability scores is a predetermined value or larger. The optimal operation time is recorded corresponding to every degree-of-difficulty level and every proofreader ability level in the optimal operation time table (FIG. 10).

As discussed above, the proofreader ability evaluation system in the second embodiment repeats the proofreading operation of the manuscripts having the same degree-of-difficulty level, and sets, as the optimal operation time, a time when the difference in the descending direction between the proofreader ability scores is the predetermined value or larger. Accordingly, it is feasible to preset such an optimal operation time that the proofreader ability score does not decrease under the predetermined value according to every degree-of-difficulty level and every proofreader level.

Modified Example of Setting Optimal Operation Time

The second embodiment has exemplified the system for evaluating the proofreading operation beforehand and determining the optimal operation time. The optimal operation time may be set dynamically in connection with the proofreading operation. FIG. 12 is a flowchart showing processing steps for dynamically determining the optimal operation time. Referring to FIG. 12, the processes in S1 through S5 are the same as those in FIG. 11, and hence their explanations are omitted. It is noted that the operations in S1 through S5 are not for evaluating the ability of the proofreader but are the normal proofreading operations.

The server 1, after completing the proofreading (S4) and executing the proofreader evaluation 1 (S5), calculates the change (difference) between the proofreader ability score as in the case of FIG. 11 (S11).

Next, the server 1 reads the optimal operation time from the optimal operation time table in which the optimal operation time is entered corresponding to every degree-of-difficulty level and every proofreader ability level (S31). Then, the server 1 judges whether or not the optimal operation time elapses at the relevant proofreader ability level corresponding to the degree-of-difficulty level concerned (S32).

If the optimal operation time does not elapse, the server 1 sets a different document having the same degree-of-difficulty level, and loops the control back to S1 in order to continue the proofreading operation.

If the optimal operation time elapses, the server 1 reads the change in the proofreader score of the relevant proofreader that is recorded last (S34). Then, the server 1 judges whether or not the change in the proofreader score exceeds the threshold value in the descending direction (S35).

If the change in the proofreader score does not exceed the threshold value in the descending direction, the server 1 increments the optimal operation time by one unit (S36). Subsequently, the server 1 writes the thus incremented optimal operation time in the optimal operation time table in which the optimal operation time is entered corresponding to every degree-of-difficulty level and every proofreader ability level.

Whereas if the change in the proofreader score exceeds the threshold value in the descending direction, the server 1 decrements the optimal operation time by one unit (S37). Then, the server 1 writes the thus decremented optimal operation time in the optimal operation time table in which the optimal operation time is entered corresponding to every degree-of-difficulty level and every proofreader ability level.

Next, the server 1 judges whether or not the proofreading operations of all the documents are finished (S38). If the proofreading operations of all the documents are not finished, the server 1 replaces the proofreader (operator), and sets the control back to S1 to continue the proofreading operation.

If the proofreading operations of all the documents are finished, the server 1 finishes the process of dynamically determining the optimal operation time.

As discussed above, in the processes shown in FIG. 12, each time the proofreader finishes the proofreading operation for the optimal operation time, it is confirmed whether or not the change in the proofreader score exceeds the threshold value in the descending direction, and the optimal time is set afresh. Accordingly, the present system is capable of obtaining the optimal operation time corresponding to what is actual, following up the achievement of the proofreading operation.

Readable-by-Computer Recording Medium

The program executed in the server 1 in the embodiments discussed above may be recorded on a readable-by-computer recording medium. Then, the computer reads and executes the program on this recording medium, thereby functioning as the server 1 shown in the embodiments discussed above.

Herein, the readable-by-computer recording medium embraces recording mediums capable of storing information such as data, programs, etc. electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

Data Communication Signal Embodied in Carrier Wave

Furthermore, the above program may be stored in the hard disk and the memory of the computer, and downloaded to other computers via communication media. In this case, the program is transmitted as data communication signals embodied in carrier waves via the communication media. Then, the computer downloaded with this program can be made to function as the server 1 in the embodiments discussed above.

Herein, the communication media may be any one of cable communication mediums such as metallic cables including a coaxial cable and a twisted pair cable, optical communication cables, or wireless communication media such as satellite communications, ground wave wireless communications, etc.

Further, the carrier waves are electromagnetic waves for modulating the data communication signals, or the light. The carrier waves may, however, be DC signals. In this case, the data communication signal takes a base band waveform with no carrier wave. Accordingly, the data communication signal embodied in the carrier wave may be anyone of a modulated broadband signal and an unmodulated base band signal (corresponding to a case of setting a DC signal having a voltage of 0 as a carrier wave).

What is claimed is:

1. A method of managing an ability of a proofreader who proofreads an electronic document generated from a recognition target document by executing character auto recognition programs, comprising:

estimating a character count of potential mis-recognized characters contained in the electronic document;

detecting a mis-recognized character discover count with which the proofreader discovers the mis-recognized characters in the electronic document;

detecting a processing time spent for proofreading the electronic document; and calculating a score relative to a proofreader ability based on a ratio of the mis-recognized character discover count per unit time to the potential mis-recognized character count.

2. The method of managing an ability of a proofreader according to claim 1, further comprising:

executing a non-coincident character count between the electronic documents generated by executing plural types of character auto recognition programs with respect to the same recognition target document, and executing a character count where preciseness of the character auto recognition for each character by the character auto recognition programs is shown by a degree of coincidence and is less than or equal to a predetermined value.

3. The method of managing an ability of a proofreader according to claim 1, further comprising:

calculating a degree of difficulty of a proofreading target electronic document on the basis of a ratio of the potential mis-recognized character count to a total character count of the electronic document;

calculating a proofreader ability level by averaging the scores with respect to the plurality of proofreading target electronic documents per predetermined range of the degree of difficulty; and selecting an optimal proofreader corresponding to the degree of difficulty of the proofreading target electronic document.

4. The method of managing an ability of a proofreader according to claim 1, further comprising:

calculating a change in the score relative to the proofreader ability with respect to the operation time for consecutively proofreading the plurality of proofreading target electronic documents; and setting the operation time based on the change in the score relative to the proofreader ability.

5. The method of managing an ability of a proofreader according to claim 4, further comprising:

evaluating the proofreader ability for every predetermined operation time; and setting again the operation time on the basis of the change in the proofreader ability.

6. A system to manage an ability of a proofreader who proofreads an electronic document generated from a recognition target document by executing character auto recognition programs, comprising:

an information input/output unit detecting a mis-recognized character discover count with which the proofreader discovers the mis-recognized characters in the electronic document, and a processing time spent for proofreading the electronic document;

an information recording unit;

an information display unit; and a control unit for counting a character count of potential mis-recognized characters contained in the electronic document, and calculating a score relative to a proofreader ability based on a ratio of the mis-recognized character discover count per unit time to the potential mis-recognized character count.

7. The system to manage an ability of a proofreader according to claim 6, further comprising a timer, wherein the information input/output unit detects a start of the proofreading operation and an end of the proofreading operation, and the timer counts a period of time from the start of the proofreading operation to the end of the proofreading operation.

8. The system to manage an ability of a proofreader according to claim 6, wherein the control unit, estimates the potential mis-recognized character count by executing a non-coincident character count between the electronic documents generated by executing plural types of character auto recognition programs with respect to the same recognition target document, or by executing a character count where preciseness of the character auto recognition for each character by a character auto recognition program is shown by a degree of coincidence and is less than or equal to a predetermined value.

9. The system to manage an ability of a proofreader according to claim 6, wherein the control unit calculates a degree of difficulty of a proofreading target electronic document on the basis of a ratio of the potential mis-recognized character count to a total character count of the electronic document;

calculates a proofreader ability level by averaging the scores with respect to the plurality of proofreading target electronic documents per predetermined range of the degree of difficulty; and selects an optimal proofreader corresponding to the degree of difficulty of the proofreading target electronic document.

10. The system to manage an ability of a proofreader according to claim 6, wherein the control unit calculates a change in the score relative to the proofreader ability with respect to the operation time for consecutively proofreading the plurality of proofreading target electronic documents; and sets the operation time based on the change in the proofreader ability.

11. The system to manage an ability of a proofreader according to claim 10, wherein the control unit evaluates the proofreader ability for every predetermined operation time; and sets again the operation time on the basis of the change in the proofreader ability.

12. A computer-readable program on a recording medium, executed by a computer, to manage an ability of a proofreader who proofreads an electronic document generated from a recognition target document by executing character auto recognition programs, comprising:

estimating a character count of potential mis-recognized characters contained in the electronic document;

detecting a mis-recognized character discover count as a mis-recognized character count with which the proofreader discovers the mis-recognized characters in the electronic document;

detecting a processing time spent for proofreading the electronic document; and calculating a score relative to a proofreader ability based on a ratio of the mis-recognized character discover count per unit time to the potential mis-recognized character count.

* * * * *

UNITED STATES PATENT AND TRADEMARK OFFICE
CERTIFICATE OF CORRECTION

PATENT NO. : 6,826,317 B2
DATED : November 30, 2004
INVENTOR(S) : Akio Fujino et al.

It is certified that error appears in the above-identified patent and that said Letters Patent is hereby corrected as shown below:

Title page,
Item [75], Inventors, fourth inventor, change "Kita" to -- Kira --;

Column 14,
Line 23, change "unit," to -- unit --.

Signed and Sealed this

Thirteenth Day of December, 2005

JON W. DUDAS
*Director of the United States Patent and Trademark Office*